United States Patent [19]
Chung

[11] Patent Number: 5,333,067
[45] Date of Patent: Jul. 26, 1994

[54] APPARATUS AND METHOD FOR VELOCITY COMPENSATION OF THE SCANNING SPOT IN NON-LINEAR SCANNING SYSTEMS

[75] Inventor: Yee-Ming Chung, South Pasadena, Calif.

[73] Assignee: Olive Tree Technology, Inc., Calif.

[21] Appl. No.: 784,567

[22] Filed: Oct. 29, 1991

[51] Int. Cl.⁵ .............................................. H04N 1/04
[52] U.S. Cl. ..................................... 358/474; 348/203
[58] Field of Search .................... 341/127, 139, 144; 358/409, 199, 205, 206, 474; 359/237

[56] References Cited

U.S. PATENT DOCUMENTS

| | | | |
|---|---|---|---|
| 4,541,061 | 9/1985 | Schoon | 364/518 |
| 4,586,057 | 4/1986 | Schoon | 358/293 |
| 4,972,258 | 11/1990 | Wolf et al. | 358/93 |
| 5,115,328 | 5/1992 | Kadono | 358/474 |
| 5,121,138 | 6/1992 | Scherwer et al. | 358/296 |
| 5,146,224 | 9/1992 | Kitayoshi | 341/144 |
| 5,164,843 | 11/1992 | Swanberg | 358/474 |

Primary Examiner—Ian J. Lobo
Attorney, Agent, or Firm—Matthew F. Jodziewicz

[57] ABSTRACT

Apparatus for generating a pixel clock to control the timing of data pulses in an optical scanning device. A VCO is utilized to generate the pixel clock. The control voltage for the VCO is provided by a digital-to-analog converter ("DAC") which converts the count generated by a pixel reference location counter driven by a reference clock. The output of the DAC is fed back as the reference voltage for the DAC. The effect is to either increase or decrease the DAC reference voltage depending on whether positive or negative feedback is implemented, thereby varying the pixel clock frequency for the image data stream as a function of pixel position. By selecting the appropriate feedback and feedback gain, the pixel placement can be made uniform across the scan line.

20 Claims, 4 Drawing Sheets

APPARATUS AND METHOD FOR VELOCITY COMPENSATION OF THE SCANNING SPOT IN NON-LINEAR SCANNING SYSTEMS

NOTICE REGARDING COPYRIGHTED MATERIAL

A portion of the disclosure of this patent document contains materials which are subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates, in general, to optical scanning and, more particularly, to the control of pixel clock timing in optical scanning devices for maintaining uniform pixel spacing across a scan line.

2. Description of Related Art

Optical scanning devices are found in many types of office machines, such as facsimile machines, laser printers, optical scanners, etc. A typical optical scanning device comprises a light source producing a light beam and a rotating, reflective surface deflecting the light beam to scan across a desired surface. The light beam scans the surface one line at a time to read or write a composite image. In the image reading mode, the light beam is scanned across an image surface and the intensity of light reflected from the image is read and recorded to represent the image. In the printing mode, the light beam, encoded with image information, is scanned across a photoreceptor surface. The light beam is focused to a spot which moves across the photoreceptor surface as the light beam is turned on and off in accordance with the image information to define pixels of the image.

The light beam is typically deflected at a constant angular velocity by the rotating, reflective surface. Since the scanned surface is planar, not all portions of the scanned surface are equidistant from the reflective surface. Therefore, the spot made by the light beam moves across the scanned (flat) surface at a changing linear speed during a scan cycle, the spot-speed being higher at the beginning and end of the scan where regions of the scanned surface are farther from the reflective surface than more central regions located at the middle of the scan. This means that when data representing an image is supplied at a constant timing rate to the light source, the spacing of the pixels along the scan line will be greater at the higher spot-speed regions (the extremities of the scan) than at the middle portions of the scan. The non-uniformity in pixel spacing arising from variation in spot-speed is undesirable for most printing applications. This is because non-uniformity in pixel spacing across the scan line, results in a distorted raster which, in turn, results in dimensional distortion of the image.

One can compensate for variations in the spot-speed either optically or electronically. Optical compensation typically involves the incorporation of a so-called F-theta lens interposed along the light beam between the reflective surface and the scanned surface. The F-theta lens, however, introduces aberrations which cause field curvature in the image plane, thereby adversely affecting the focusing of the spot.

Electronic compensation involves the adjustment of the timing rate at which image data pulses are supplied to the light source. This typically requires adjusting the control voltage of a voltage controlled oscillator ("VCO") responsible for generating the pixel clock signal used to gate the image data pulses and turn the light beam on and off at each pixel location along the scan line. Varying the clock frequency, and thereby the timing of individual data pulses, serves to control pixel placement along the scan line.

Heretofore, the means to generate the VCO control voltage have been complex and expensive for acceptable pixel spacing uniformity.

SUMMARY OF THE INVENTION

The present invention is directed to means for generating a pixel clock for controlling the timing of an image data stream that provides for uniform spacing of pixels across a scan line. A VCO is utilized to generate the pixel clock. The control voltage for the VCO is provided by a digital-to-analog signal converter ("DAC") which converts the digital count generated by a pixel reference location counter, that is driven by a reference clock, to a corresponding analog voltage signal. The output of the DAC is fed back to the DAC as a reference voltage. The effect of this feedback loop, is to either increase or decrease the DAC reference voltage, depending on whether positive or negative feedback is implemented, thereby permitting the pixel clock frequency for the image data stream to vary as a function of pixel position. By selecting the appropriate feedback and feedback gain in the circuit, the pixel placement can be made uniform across a scan line.

DESCRIPTION OF INVENTION

The following description is of the best contemplated mode of carrying out the invention. This description is made for the purpose of illustrating the general principles of the invention and should not be taken in a limiting sense. The scope of the invention is best determined by reference to the appended claims.

While the preferred embodiment of the present invention is described with reference to a laser printer, the present invention is also applicable to other types of scanning devices including, but not limited to, facsimile machines, optical scanners, document readers, etc.

Figure 1:
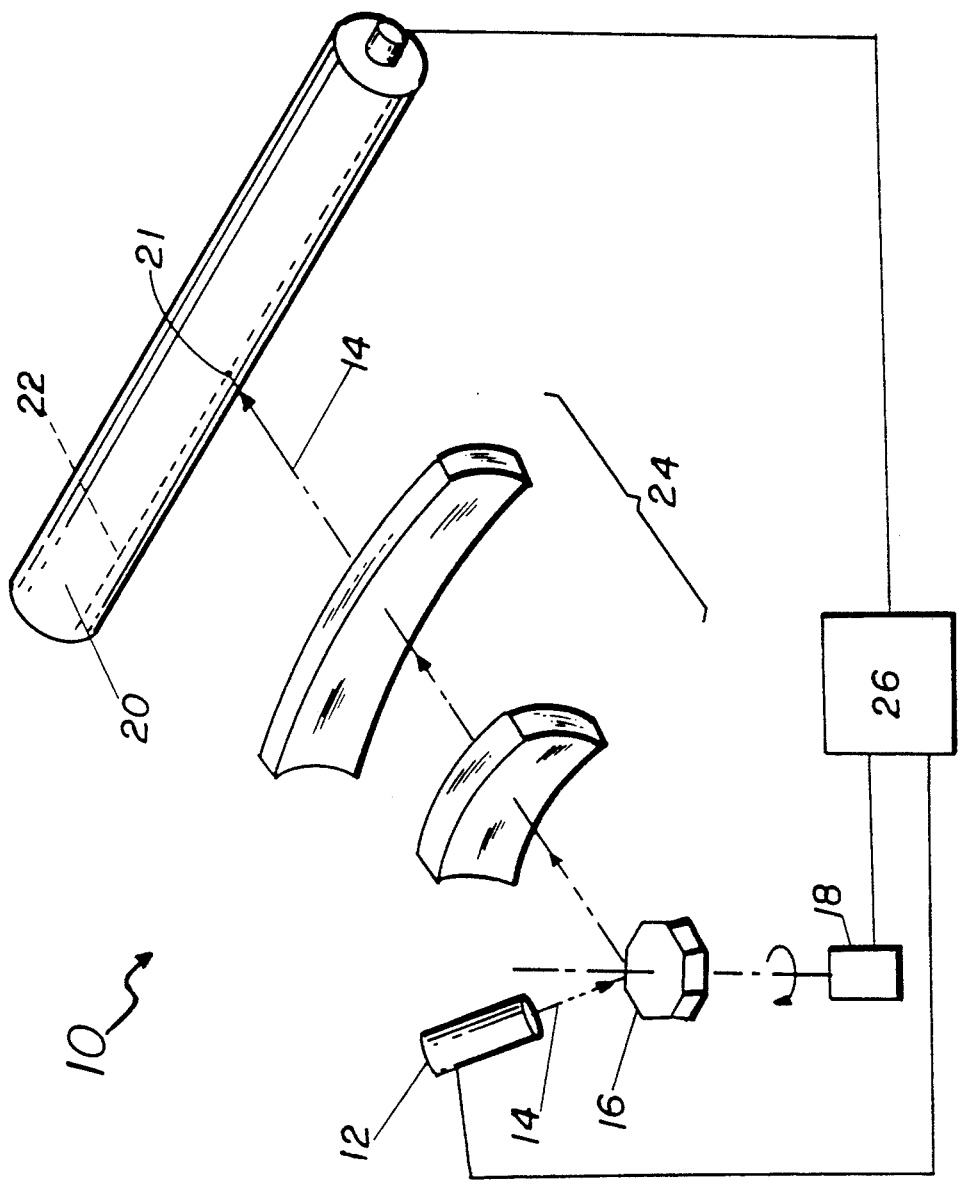
FIG. 1 is schematic representation of a laser scanner apparatus.

FIG. 1 is a schematic representation of the configuration of a laser printer 10. The printer 10 comprises a light source 12, for example, a diode laser, which generates a coherent light beam 14. A rotating reflective surface shown in the diagram to be a multifacet polygon mirror 16 is driven by a motor 18 to deflect the light beam 14 towards a photoreceptor 20. The rotation of the mirror 16 causes the light beam 14 to scan along the length of the photoreceptor 20, defining a scan line 22 and a scan plane containing the scan line 22 and the light beam 14. Ideally, the photoreceptor 20 is driven to rotate slightly at the end of each scan. By synchronizing the rotation of the mirror 16 and the photoreceptor 20, the light beam 14 can be caused to scan across the entire surface of the photoreceptor 20 line by line.

A system of lenses 24 are interposed between the mirror 16 and the photoreceptor 20 to allow the light beam 14 to be in focus over the entire flat scan line by flattening the image field. As are documented in co-pending U.S. Pat. application Ser. Nos. 07/496,459 filed Mar. 20, 1990 now abandoned and 07/503,734 filed Apr. 3, 1990 now U.S. Pat. No. 5,196,957 (commonly assigned to the assignee of the present invention), the optical geometry of the lenses 24 are designed to introduce minimum aberrations in the light beam 14 so as to significantly reduce field curvature effects at the image plane. The light beam 14 is focused to a light spot which moves across the length of the photoreceptor 20 as the light beam 14 is deflected by the rotating mirror 16. By appropriately turning the light beam 14 on and off as it scans the photoreceptor 20, the photoreceptor 20 can be photostatically encoded with information relating to an image to be printed. Specifically, the image comprises pixels (e.g. 300 dots-per-inch), some of which corresponding to black spots (light beam on) and some to white spots (light beam off).

In printing operation, a controller 26 receives data pulses corresponding to an image to be printed from for example a personal computer. The controller 26 processes the data and controls the on/off of the light source 12 in accordance with the image data pulses, and also synchronizes the rotations of the mirror 16 and photoreceptor 20. To compensate for variation of spot-speed along the length of the photoreceptor 20, the timing of the placement of the pixels (i.e. the on/off of the light beam 14) is controlled such that the spacing between pixels (black or white spots) is uniform. In this regard, the controller 26 has a pixel clock having timing control in accordance with the present invention.

Figure 2:
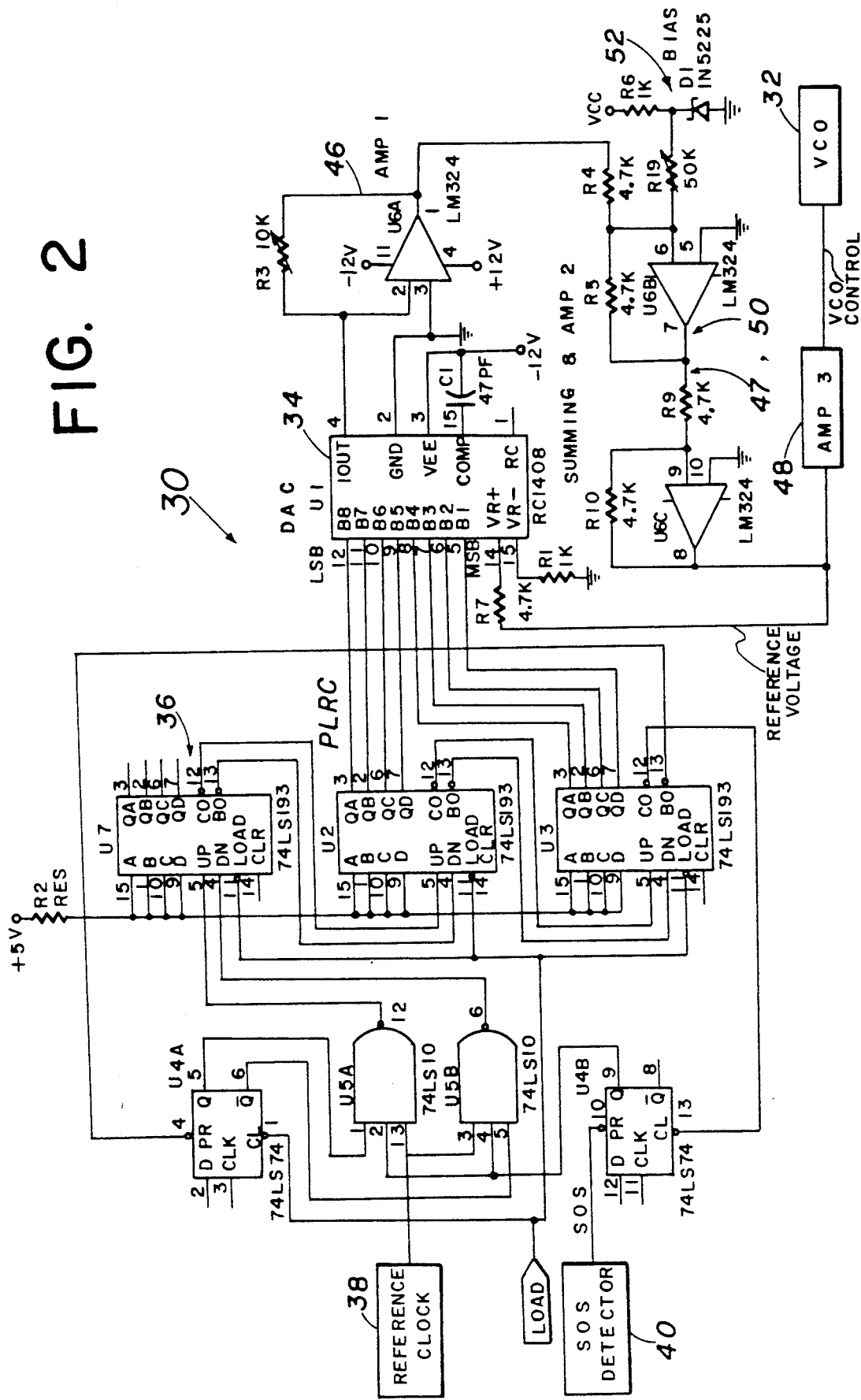
FIG. 2 is a pixel clock controller circuit in accordance with one embodiment of the present invention.
Figure 3:
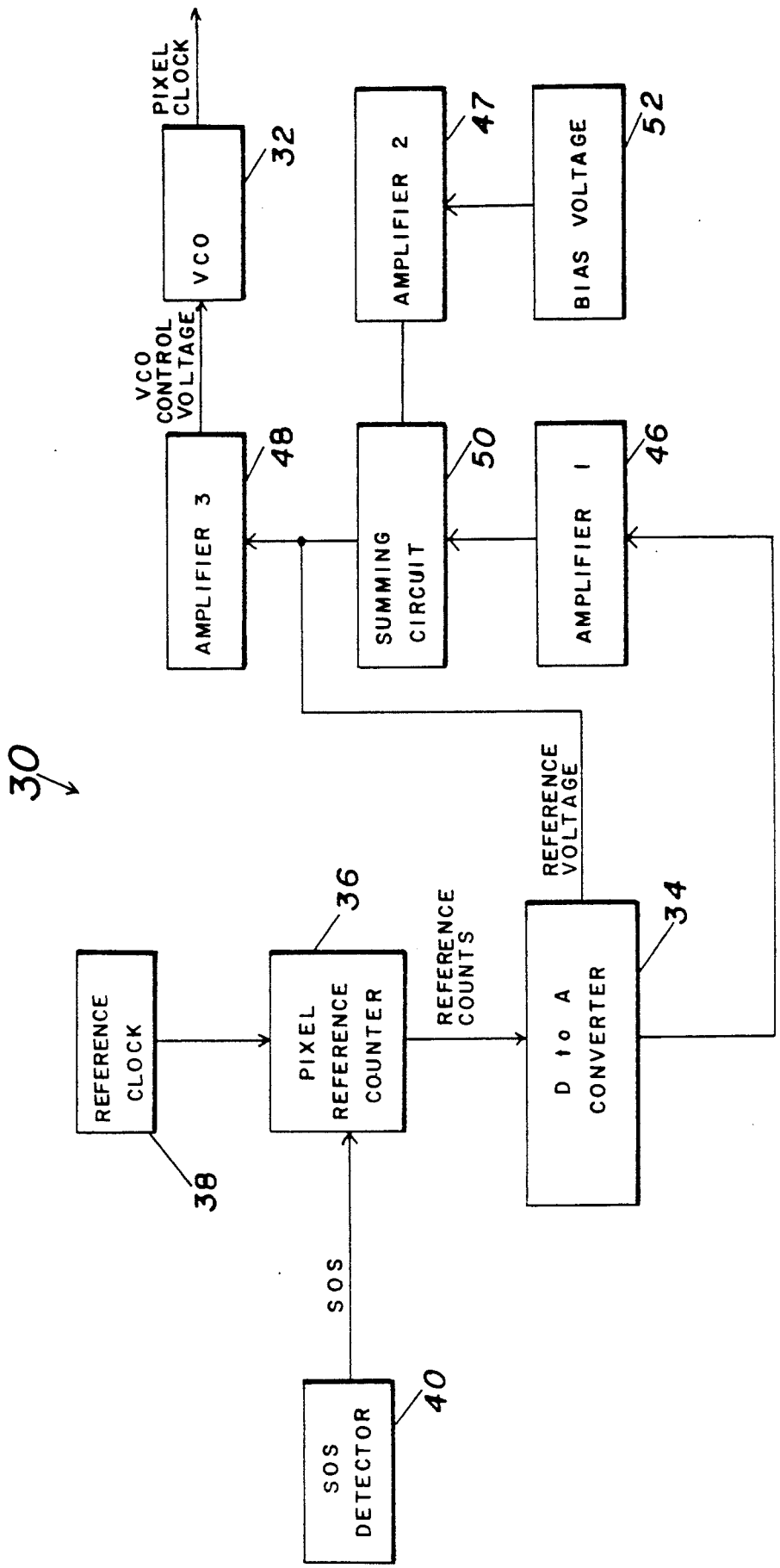
FIG. 3 is a block diagram of the pixel clock controller of FIG. 2.

The diagram of a circuit 30 in accordance with one embodiment of the present invention for generation of pixel clock is shown in FIG. 2 and the block diagram thereof is shown in FIG. 3. The circuit 30 comprises a VCO 32 which generates a pixel clock controlling the timing of the image data pulses in accordance with the scan location. The control voltage for the VCO 32 is provided by an 8-bit DAC 34 which feeds back the output as its reference voltage. DAC 34 is driven by a pixel location reference counter 36 ("PLRC") which generates digital counts in accordance with signals synchronized with a reference clock 38 and a start-of-scan ("SOS") signal detector 40. The SOS signal detector 40 is synchronized with the angular position of the rotating mirror 16 to indicate the beginning of each scan. In this regard, the PLRC 36 can be used as a scan location reference. The reference voltage for setting the conversion gain of the DAC 34, is initially provided DAC 34 at system start-up by a bias voltage source 52 applied via an amplifier 47. Thereafter, the reference voltage is provided DAC 34 by an amplified feedback of the DAC output voltage. The bias voltage then is applied as an offset to the reference voltage through the use of a summing circuit 50 which sums the outputs of the amplifiers 46 and 47.

The effect of feedback of the DAC 34 output as reference voltage is to continuously vary the DAC conversion gain so as to smoothly vary the DAC output despite its low 8-bit (256 units) resolution with respect to the 2000-count PLRC 36. The result is a pixel clock that changes frequency as a function of pixel position along the scan line 22. In the illustrated embodiment of the present invention shown in the Figs., for a complete scan along the entire length of the photoreceptor 20, the pixel clock frequency decreases from a maximum value at the start of the scan to a minimum value at the midpoint 21 of the scan (see FIG. 1), and then increases from the minimum value to a maximum value while approaching the end of the scan. The clock frequency is continuously maintained proportional to the speed of the light spot along the scan line, thus maintaining the pixel spacing uniform throughout the scan line. The result of clock frequency variation with respect to scan position is shown in idealized form in FIG. 4 (exaggerated), which can be approximated by a smooth curve 44.

Figure 4:
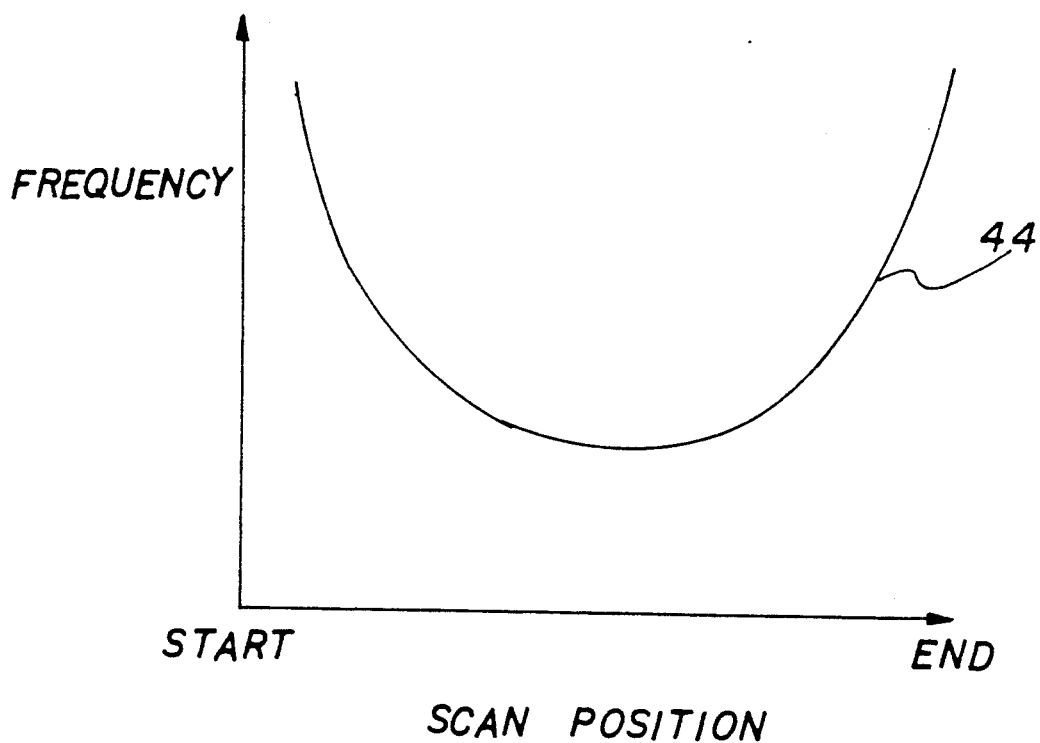
FIG. 4 is a graph of pixel clock frequency with respect to scan position obtained using a pixel clock controller in accordance with the present invention.

Particularly, the PLRC 36 generates counts from 2000 (at the start of the scan) to 0 (at the mid-point of the scan) to 2000 (at the end of the scan). As the count decreases, the DAC output voltage decreases. This voltage, when fed back to the DAC 34 as reference voltage, will decrease the conversion gain of the DAC 34 for the next digital to analog conversion. The net effect is that for high counts (near the ends of the scan), the change in DAC output voltage is less gradual than at low counts (near scan midpoints). In other words, the slope of the curve in FIG. 4 is steeper at high counts (scan ends) as compared to that at low counts (scan midpoint). It can be appreciated that while the 8-bit DAC 34 without feedback has relatively low conversion resolution, by using the 8-bit DAC 34 with feedback in conjunction with the 2000-count PLRC 36, the resolution of the DAC output is effectively improved as the DAC reference voltage is continuously decreased.

In the embodiment shown in FIGS. 2 and 3, the amplifiers 46, 47 and 48, are preferably operational amplifiers. It has been deduced that the gain of the amplifier 47 determines the offset to the DAC reference voltage, while the gain of the amplifier 46 determines the curvature of the frequency correction curve. Depending on the particular frequency correction curve desired, the respective amplifier gains can be appropriately selected. By way of example, the gain of amplifier 46 can be set at 0.638 with R3=3K-Ohm and the gain of amplifier 47 can be set at 0.47 with R19=10K-Ohm for a bias voltage of 2.55V. Instead of positive feedback, as is implemented in the described embodiment, negative feedback may also be implemented to obtain the desired pixel clock frequency correction curve.

While the invention has been described with respect to the preferred embodiments in accordance therewith, it will be apparent to those skilled in the art that various modifications and improvements may be made without departing from the scope and spirit of the invention. Accordingly, it is to be understood that the invention is not to be limited by the specific illustrated embodiments, but only by the scope of the appended claims.

I claim:

1. A device, for use in an optical scanner to generate a pixel clock, comprising:

pixel location reference means for determining the location of a pixel in a scan and for generating a digital signal representative thereof;

digital to analog converter means for converting said digital signal to a corresponding analog voltage output signal;

feedback means for feeding back said converter means analog voltage output signal as reference voltage signal to said converter means for continuously altering the conversion gain of said converter means; and voltage controlled oscillator means for generating, as an output signal, a plurality of pixel clock frequency signals corresponding to a pixel clock having a frequency signal varying in accord with said analog voltage output signal of the converter means.

2. A device as in claim 1 wherein said feedback means comprises:

an amplifier having a gain selected to generate a predetermined frequency variation in said plurality of pixel clock frequency signals characteristic of the pixel location of each said pixel in said scan.

3. A device as in claim 2 wherein the feedback gain of said feedback means is chosen such that uniform spacing of each said pixel throughout said scan can be obtained.

4. A device as in claim 3 wherein the pixel location reference means comprises means for detecting start of scan and a reference clock.

5. A device as in claim 4 wherein the pixel location reference means further includes pixel location reference counter means responsive to said start of scan signal and said reference clock signal for generating said digital signal in a plurality of timed count segments.

6. A device as in claim 5 wherein said pixel location reference counter means generates said plurality of timed count segments in a sequence that decreases from a specified maximum duration value corresponding to a pixel location at an extremity of said scan, to a minimum duration value corresponding to a pixel location at the mid-point of said scan, and then increasing from said minimum duration value to said maximum duration value.

7. A method of generating a pixel clock in an optical scanner comprising the steps of:

determining the location of a pixel in a scan and generating a digital signal representative thereof;

converting in a digital analog converter said digital signal to an analog voltage output signal;

feeding back said analog voltage output signal as a reference voltage to said converter for continuously altering the conversion gain of said converter; and generating a pixel clock signal responsive to said analog voltage output signal, having a frequency varying directly in accord with said analog voltage output signal.

8. A method as in claim 7 wherein said step of feeding back said analog voltage output signal further includes the step of:

amplifying said analog voltage output signal with a feedback gain chosen to generate a predetermined frequency variation in said pixel clock signal characteristic of the pixel location of said pixel in said scan.

9. A method as in claim 8 further including the step of:

selecting said feedback gain such that uniform pixel spacing can be obtained throughout said scan.

10. A method as in claim 9 wherein the step of determining the location of a pixel further includes the step of:

detecting the start of said scan and referring to a reference clock signal generated by a reference clock.

11. A device as in claim 10 wherein said step of generating said digital signal further includes the step of:

dividing said digital signal into a plurality of timed count segments responsive to the detected start of said scan and said reference clock signals.

12. A device as in claim 11 wherein said step of dividing said digital signals into a plurality of timed count segments further includes a step of:

generating a sequence of said plurality of timed count segments that decreases from a specified maximum duration value corresponding to a pixel location at an extremity of said scan, to a minimum duration value corresponding to a pixel location at the midpoint of said scan, and then increasing from said minimum duration value to said maximum duration value.

13. An optical scanning device comprising:

a light source generating a light beam;

means for directing said light beam along a scan line on a surface;

pixel location reference means for determining the location of a pixel on said scan line, and for generating an electrical pixel location signal representative of the location of said pixel;

amplifier means responsive to said pixel location signal for amplifying said pixel location signal and generating a timing control signal;

feedback means responsive to said timing control signal for providing a reference voltage signal as an input signal to said amplifier means, said reference voltage signal adapted for continuously altering the gain of said amplifier means;

voltage controlled oscillator means responsive to said timing control signal for generating a pixel clock timing signal having a frequency that varies in a predetermined relationship with said timing control signal; and, control means responsive to said pixel clock timing signal and a pixel data pulse signal for controlling said light beam to produce a pixel on said scan line.

14. A device as in claim 13 wherein said feedback means comprises an amplifier having a gain selected to generate a desired frequency variation in said pixel clock timing signal characteristic of the pixel location on said scan line.

15. A device as in claim 14 wherein the feedback gain of said feedback means is chosen such that uniform pixel spacing across said scan line can be obtained.

16. A device as in claim 15 wherein said pixel location reference means includes:

means for detecting the start of said scan line and for generating a start of scan signal; and, reference clock means for generating a reference clock signal.

17. A device as in claim 16 wherein said pixel location reference means further includes pixel location reference counter means responsive to said start of scan signal and said reference clock signal for generating said pixel location signal in a plurality of timed divisions.

18. A device as in claim 17 wherein said pixel location reference counter means generates said plurality of timed divisions in a sequence that decreases in duration from a specified maximum duration value corresponding to a pixel location at an extremity of said scan, to a minimum duration value corresponding to a pixel location at the mid-point of said scan, and then increasing from said minimum duration value to said maximum duration value.

19. A device as in claim 18 wherein said scan line is on the surface of a photoreceptor.

20. A device as in claim 19 further comprising a system of lenses for focusing said light beam to a spot on the photoreceptor.

* * * * *